A. E. DANKE.
HAY LOADER.
APPLICATION FILED NOV. 7, 1918.

1,348,212. Patented Aug. 3, 1920.

A. E. DANKE INVENTOR.

BY E. J. Bond

*His* ATTORNEY.

UNITED STATES PATENT OFFICE.

ARTHUR E. DANKE, OF NEENAH, WISCONSIN, ASSIGNOR TO STERLING MANUFACTURING COMPANY, OF STERLING, ILLINOIS, A CORPORATION.

HAY-LOADER.

1,348,212.     Specification of Letters Patent.     Patented Aug. 3, 1920.

Application filed November 7, 1918. Serial No. 261,489.

*To all whom it may concern:*

Be it known that I, ARTHUR E. DANKE, a citizen of the United States of America, residing at Neenah, in the county of Winnebago and State of Wisconsin, have invented certain new and useful Improvements in Hay-Loaders, of which the following is a specification, reference being had therein to the accompanying drawing.

The invention relates to hay-loaders of the kind in which a drum provided with tines in traveling over the ground picks up the load, such as hay, and delivers it to an elevated portion of the loader.

The invention has for its object the provision of means whereby the drum may be raised or lowered in accordance with the character of the ground so as to prevent the tines from digging into the ground when the latter is uneven, but permitting operation of the drum in the case of flat or level ground.

A further object of the invention comprises the provision of eccentrics interposed between the wheels and axle, so that upon actuation of the eccentrics the drum is raised or lowered in accordance with the direction of actuation of said eccentrics.

It is also an object of the invention to provide means for locking the eccentrics in adjusted position so that accidental rotation of the eccentrics is precluded.

To the accomplishment of these and related ends which are partly obvious and partly ascertainable from a perusal of the following specification, the means constituting the invention are illustrated in the annexed drawing and particularly pointed out in the claims forming part of the specification.

In said drawing—

Figure 1:
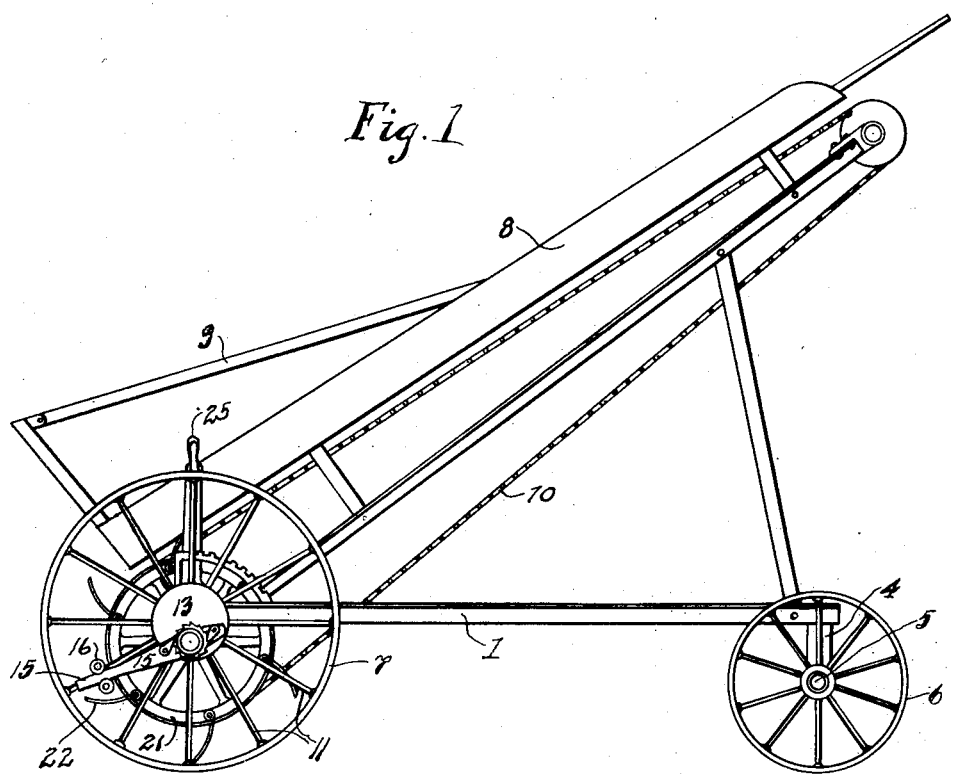
Figure 1 is a side view of a hay-loader constructed in accordance with my invention.

Referring to the several figures of the drawing, the hay-loader comprises longitudinally formed members 1, secured to the rear axle 2 by bearings 3. The forward extremities of the members 1 are supported by bearings 4 from the front axle 5, carried by the front wheels 6. The rear axle 2 is carried by the wheels 7. The members 1 form a support for the hay-loader which includes side boards 8, wind breaker arms 9, and a conveyer chain 10. These parts being immaterial as far as the present invention is concerned this brief reference thereto will therefore suffice. The rear wheel 7 is connected by a plurality of spokes 11 to a hub 12 provided with an eccentric bore to receive an eccentric barrel 13, formed at one end with a shoulder 14 bearing against the hub 12. The axle 2 loosely extends through the bearing 3 and the eccentric barrel 13 and projects therebeyond for a purpose presently to be described.

Figure 2:
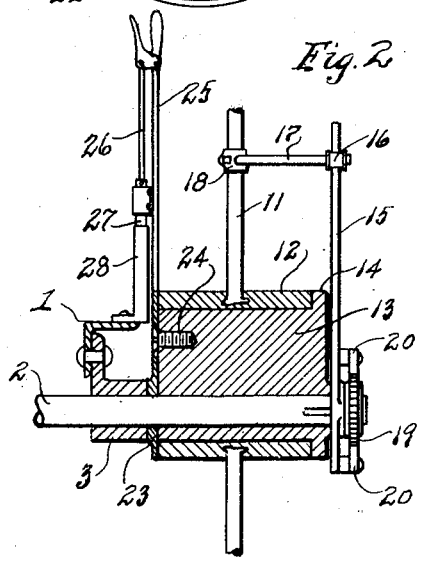
Fig. 2 is a fragmentary sectional view of the hub of a rear wheel and adjacent parts on line 2—2 of Fig. 3.

As indicated in Figs. 1 and 2 a lever 15 is loosely arranged on the axle 2 and extends between two rollers 16 arranged at rod 17, disposed parallel to the axle and secured at their ends to a collar 18, clamped to a spoke 11. The lever 15 has pivotally secured thereto spring-pressed pawls 20 adapted to engage a ratchet wheel 19 fast to the projecting end of the axle 2. From the foregoing it is obvious that when the hay-loader is in forward motion the lever 15, driven by the wheel by virtue of the roller 16, transmits rotary motion to the axle 2, on which a drum 21, provided with tines 22, is secured. In rearward motion of the vehicle, however, the pawls 20 merely ride over the wheel 19 and produce no rotation thereof or of the drum. To the inner end of the eccentric barrel 13 a plate 23 is secured by a screw 24. The plate 23 loosely surrounds the axle 2 and may be swung together with the eccentric barrel 13 about the axle 2 as a pivot. To facilitate rotation of the eccentric barrel the plate 23 is formed integral with a lever 25 provided with a spring-controlled locking lever 26, of the conventional type whose latch 27 may be brought into mesh with the teeth of a quadrant 28, secured to the frame member 1.

Figure 3:
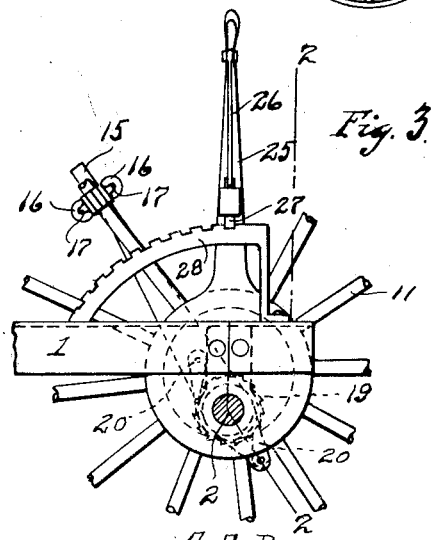
Fig. 3 is a side view from the left of the parts shown in Fig. 2.

As shown in Fig. 3 the quadrant is concentric with the axle 2 as the lever 25 oscillates about said axle. The adjustment of the drum is effected in the following manner: Assuming the parts to be in the position shown in Fig. 3, the drum on the axle 2 is then in operative relation with respect to the ground, and upon forward motion of the vehicle the axle 2 and drum 21 rotate, the latter being in the position in which the tines engage the hay scattered on the ground. In moving over uneven ground, where the tines would dig into the soil, the lever 26 is released from engagement with the quadrant 28 and the lever 25 is swung forwardly or, as viewed in Fig. 3, to the left hand side. This swinging of the lever 25 which is secured to the eccentric barrel 13, eccentrically rotates said barrel around the axle 2, which movement will effect the lowering of the wheels 7, or conversely, an elevation of the drum and supporting axle, whereby said drum is lifted and maintained at a height sufficiently above the ground to clear the tines from any engagement therewith. It is of course understood that both rear wheels are constructed identical and have the same appurtenances.

While the drawing discloses the preferred embodiment of the invention, numerous changes and alterations may be made without departing from the spirit and scope of the invention and it is my intention not to confine myself to the details as shown but to include within the purview of the invention all alterations and changes constituting obvious departures.

I claim:

1. The combination with the rear axle and wheels of a hay loader, of a tine carrying drum secured to the axle, eccentrics for raising and lowering the drum and means for clutching the wheels to the axle.

2. The combination with the rear axle and wheels of a hay loader, of a tine carrying drum secured to the axle, eccentrics for raising and lowering the drum, the wheels being mounted on said eccentrics, and means for clutching the wheels to the axle.

3. The combination with the rear axle and wheels of a hay loader, of a drum mounted concentrically with and on the axle, means for supporting the wheels eccentrically on the axle, and means for clutching the wheels to the axle.

4. The combination with the rear axle and wheels of a hay loader, of a tine carrying drum mounted on the axle, eccentrics mounted on the axle for raising and lowering the drum, the wheels being mounted on the eccentrics, and means for clutching the wheels to the axle.

5. The combination with the rear axle and wheels of a hay loader, of a tine carrying drum mounted on the axle, eccentrics for raising and lowering the drum, the wheels being mounted on the eccentrics, means secured to the axle and connected to the wheels for causing the rotation of the former upon the rotation of the latter, the connection being such as to permit the wheels to move eccentrically with relation to the axle.

6. The combination with the rear axle and wheels of a hay loader, of a drum secured to the axle, eccentric barrels mounted on the axle, the wheels being mounted on said barrels, means for adjusting the barrels with relation to the axle, an arm mounted on and extending from the axle and having radial sliding movements with relation to the adjacent wheel, but being prevented from rotating independently of the rotation of the wheel, and means for clutching the arm to the axle, whereby upon the rotation of the wheels the axle and drum will be rotated.

In testimony whereof I hereunto affix my signature.

ARTHUR E. DANKE.